(12) United States Patent
Yamauchi

(10) Patent No.: US 11,592,114 B2
(45) Date of Patent: Feb. 28, 2023

(54) FLUID HANDLING DEVICE AND FLUID HANDLING SYSTEM

(71) Applicant: Enplas Corporation, Saitama (JP)

(72) Inventor: Takumi Yamauchi, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 17/579,615

(22) Filed: Jan. 20, 2022

(65) Prior Publication Data

US 2022/0235868 A1 Jul. 28, 2022

(30) Foreign Application Priority Data

Jan. 27, 2021 (JP) .............................. JP2021-011474

(51) Int. Cl.
*F16K 7/16* (2006.01)
(52) U.S. Cl.
CPC ..................................... *F16K 7/16* (2013.01)
(58) Field of Classification Search
CPC .......... F16K 7/126; F16K 7/16; F16K 11/166; F16K 15/1825; F16K 15/1845; F16K 15/1401; F16K 15/1402; F16K 15/141; F16K 31/52416; F16K 31/52491; Y10T 137/86517; Y10T 137/86549
See application file for complete search history.

(56) References Cited

U.S. PATENT DOCUMENTS

| 7,862,000 B2* | 1/2011 | Elizarov | F16K 99/0015 251/7 |
| 9,267,619 B2* | 2/2016 | Ono | F16K 99/0059 |
| 2011/0233443 A1 | 9/2011 | Kamada et al. | |

FOREIGN PATENT DOCUMENTS

| JP | 2011-202681 | 10/2011 | |
| WO | WO-2018030253 A1 * | 2/2018 | ............. B01J 19/00 |

* cited by examiner

*Primary Examiner* — Hailey K. Do

(57) ABSTRACT

A fluid handling device includes a first channel, a second channel, and a valve disposed at a connection part between the first channel and the second channel. The valve include a partition wall disposed between the first channel and the second channel, and a diaphragm disposed so as to face the partition wall, a portion of the first channel, and a portion of the second channel. The diaphragm is configured in such a way that when no pressure is applied to the diaphragm, a gap, which serves as a third channel that allows the first channel and the second channel to communicate with each other, is formed between the diaphragm and the partition wall. In plan view, the length of the diaphragm in the extending direction of the third channel is longer than the length of the diaphragm in the direction orthogonal to the extending direction.

5 Claims, 14 Drawing Sheets

FLUID HANDLING DEVICE AND FLUID HANDLING SYSTEM

CROSS REFERENCE TO RELATED APPLICATIONS

This application is entitled to and claims the benefit of Japanese Patent Application No. 2021-011474, filed on Jan. 27, 2021, the disclosure of which including the specification, drawings and abstract is incorporated herein by reference in its entirety.

TECHNICAL FIELD

The present invention relates to a fluid handling device and a fluid handling system.

BACKGROUND ART

In recent years, a microchannel chip or the like is used to analyze trace amounts of substances such as proteins and nucleic acids with high precision and speed. Microchannel chips have the advantage of requiring only small amounts of reagents and samples for analysis, and are expected to be used in various applications such as clinical, food, and environmental testing.

For handling two or more types of fluids, the microchannel chip is preferably provided with a valve that can easily separate channels or allows the channels to communicate each other, and also, for example, can mix the fluids at a desired timing. As a valve capable of exerting such a function, a valve provided with a diaphragm that covers a partition wall disposed between two channels is known. For example, Patent Literature (hereinafter, referred to as PTL) 1 discloses a diaphragm valve including a dome part having a shape of a partial spherical shell (dome-shaped) and a flange continuously formed at the periphery of the dome part via a boundary part. The diaphragm of this diaphragm valve has a radius of curvature R of 0.6 mm or more at the boundary part. According to PTL 1, the diaphragm valve can reduce the deterioration of long-term use durability and increase the gas flow rate.

CITATION LIST

Patent Literature

PTL 1
Japanese Patent Application Laid-Open No. 2011-202681

SUMMARY OF INVENTION

Technical Problem

In a valve having a dome-shaped diaphragm as disclosed in PTL 1, the dead volume increases in the space which is formed by being covered with the diaphragm and which is for allowing the two channels to communicate with each other. A fluid is more likely to remain with such an increased dead volume, thus using such a valve for the microchannel chip may lower the accuracy of substance analysis.

The present invention has been made in view of the above circumstances, and an object of the present invention is to provide a fluid handling device and fluid handling system which include a valve including a diaphragm with a small dead volume.

Solution to Problem

A fluid handling device according to the present invention includes a first channel; a second channel; and a valve disposed at a connection part between the first channel and the second channel, in which the valve include a partition wall disposed between the first channel and the second channel, and a diaphragm disposed so as to face the partition wall, a portion of the first channel, and a portion of the second channel, in which the diaphragm is configured in such a way that when no pressure is applied to the diaphragm, a gap is formed between the diaphragm and the partition wall, the gap serving as a third channel that allows the first channel and the second channel to communicate with each other, and when pressure is applied to the diaphragm, the diaphragm and the partition wall come into contact with each other so that the first channel and the second channel are cut off from each other, and when the diaphragm is viewed in plan view, a length of the diaphragm in an extending direction of the third channel is longer than a length of the diaphragm in a direction orthogonal to the extending direction.

A fluid handling system according to the present invention includes the fluid handling device and a rotary member configured to rotate about a central axis passing through the center of the circle, the rotary member including a protrusion for pressing the a plurality of the diaphragms.

Advantageous Effects of Invention

The present invention is capable of provide a fluid handling device and fluid handling system which include a valve including a diaphragm with a small dead volume.

DESCRIPTION OF EMBODIMENTS

Hereinafter, one or more embodiments of the present invention will be described in detail with reference to the drawings. The following will describe a microchannel chip as a typical example of a fluid handling device according to the present invention.

Figure 1A:
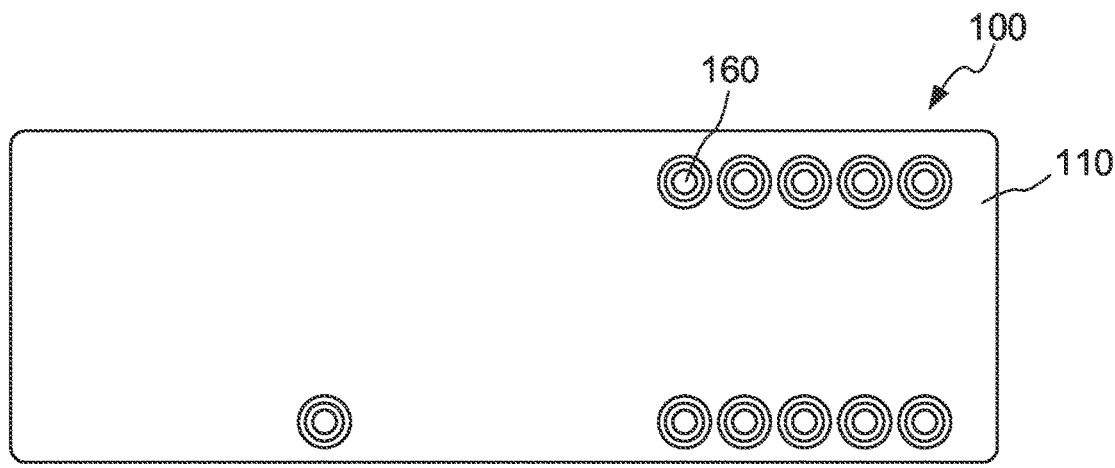
FIG. 1A is a plan view of a fluid handling device (plan view of a substrate) according to the present embodiment.
Figure 1B:
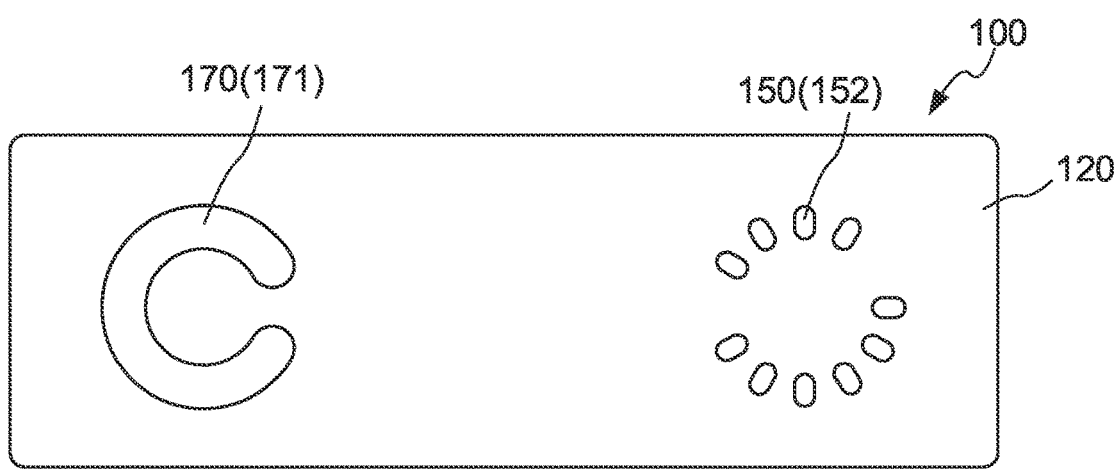
FIG. 1B is a bottom view of the fluid handling device (bottom view of a film)
Figure 1C:
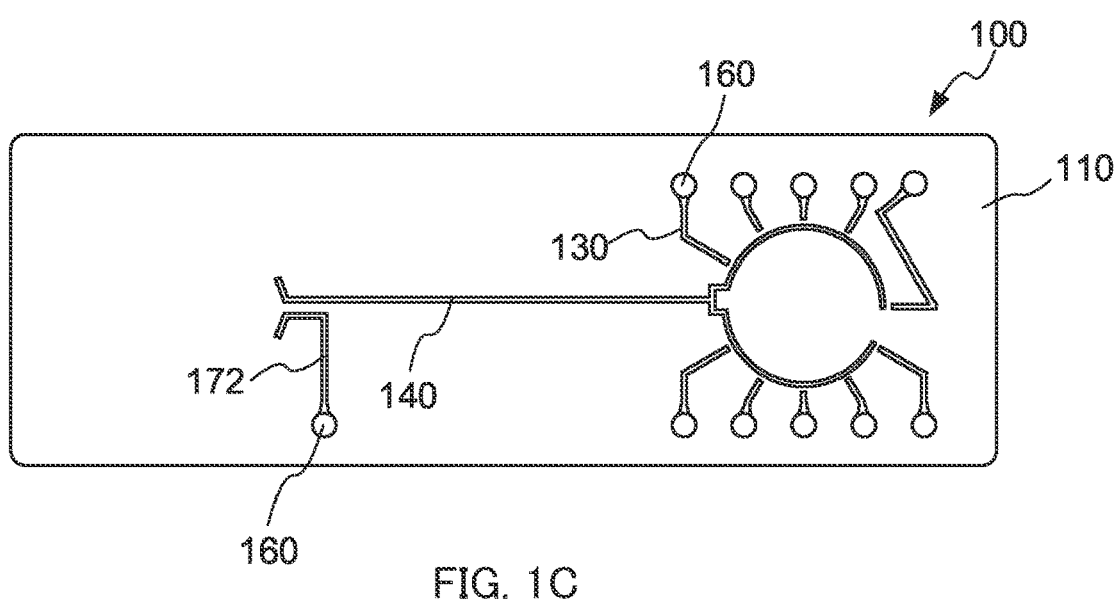
FIG. 1C is a bottom view of the substrate (bottom view of the fluid handling device with the film detached therefrom)
Figure 2:
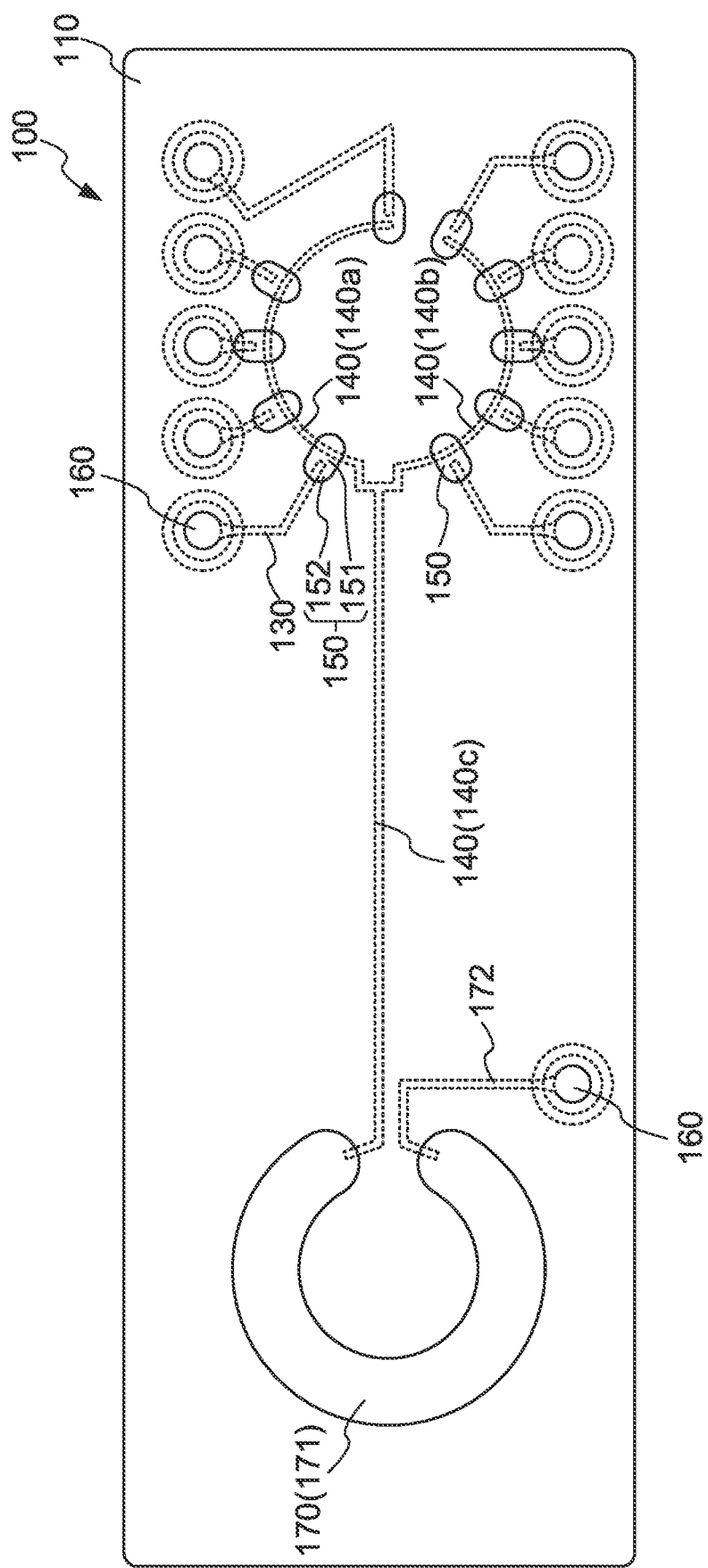
FIG. 2 is a bottom view of the fluid handling device.

1. Fluid Handling Device and Fluid Handling System
Configuration of Fluid Handling Device FIGS. 1A to 1C and FIG. 2 illustrate the configuration of fluid handling device 100. FIG. 1A is a plan view of fluid handling device 100 (plan view of substrate 110). FIG. 1B is a bottom view of fluid handling device 100 (bottom view of film 120). FIG. 1C is a bottom view of substrate 110 (bottom view of fluid handling device 100 with film 120 detached therefrom). FIG. 2 is a bottom view for describing the configuration of fluid handling device 100 (substantially the same as FIG. 1B). In FIG. 2, grooves (channel) and the like formed in substrate 110 are illustrated by broken lines.

Figure 5:
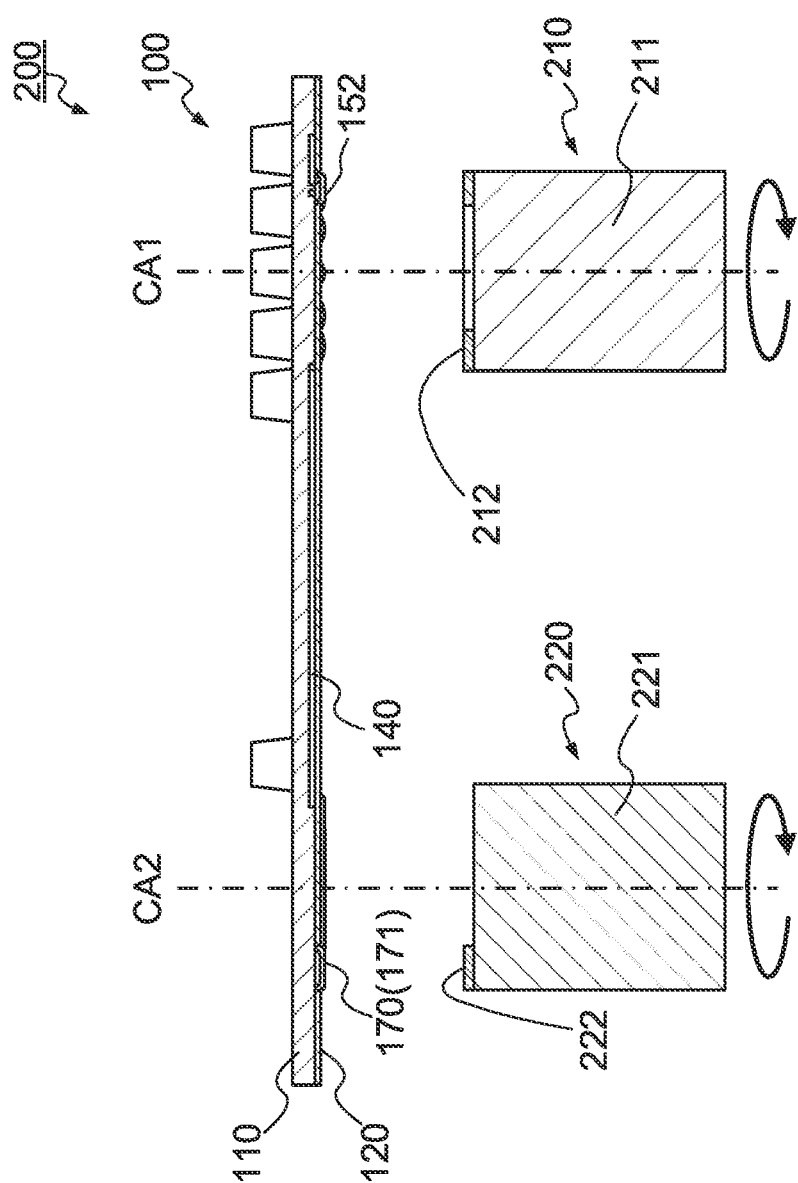
FIG. 5 is a cross-sectional view illustrating the configuration of a fluid handling system according to the present embodiment.

Fluid handling device 100 includes substrate 110 and film 120 joined to the rear surface of substrate 110 (see FIG. 5). Fluid handling device 100 also includes at least one first channel 130, at least one second channel 140, a plurality of valves 150 each disposed at the connection part between first channel 130 and second channel 140, well 160 connected to first channel 130, and rotary membrane pump 170 connected to second channel 140.

At least one groove to serve as a channel, and at least one through hole to serve as an inlet or outlet port for a fluid are formed in substrate 110. The groove to serve as a channel is formed in the rear surface of substrate 110. A portion of substrate 110 functions as a partition wall 151 (described below) of valve 150. Film 120 is joined to the rear surface of substrate 110 so as to close the groove (recess) and an opening of the through hole which are formed in the rear surface of substrate 110. A portion of film 120 functions as diaphragm 152 (described below) of valve 150. The groove of substrate 110 closed by film 120 serves as a channel for allowing a fluid such as a reagent, a liquid sample, a washing liquid, a gas, or a powder to flow therethrough.

Substrate 110 may have any thickness which is, for example, 1 mm or more and 10 mm or less. Any material may be used for substrate 110. The material included in substrate 110 can be appropriately selected from, for example, known resins and glass. Examples of the material in film 110 include polyethylene terephthalate, polycarbonate, polymethylmethacrylate, polyvinyl chloride, polypropylene, polyether, polyethylene, polystyrene, cyclo-olefin resins, silicone resins, and elastomers.

Film 120 may have any thickness that allows the film to function as diaphragm 152. The thickness of film 120 is, for example, 30 µm or more and 300 µm or less. In addition, any material that allows film 120 to function as diaphragm 152 may be used in film 120. The material in film 120 can be appropriately selected from, for example, known resins. Examples of the material in film 120 include polyethylene terephthalate, polycarbonate, polymethylmethacrylate, polyvinyl chloride, polypropylene, polyether, polyethylene, polystyrene, cyclo-olefin resins, silicone resins, and elastomers. Film 120 is joined to substrate 110 by, for example, thermal welding, laser welding, and an adhesive.

First channel 130 and second channel 140 each are a channel that allows a fluid to move therethrough. In the present embodiment, each channel is composed of a groove formed in substrate 110 and film 120 that closes the opening of the groove. The cross-sectional area and cross-sectional shape of each channel are not limited. The "cross section of a channel" as used herein means the cross section of the channel orthogonal to the flow direction of the fluid. The cross-sectional shape of each channel is, for example and without limitation, a substantially rectangular shape having the length of one side (width and depth) of about several tens of micrometers. The cross-sectional area of each channel may be or may not be constant in the flow direction of the fluid. In the present embodiment, the cross-sectional area of the channel is constant.

Figure 3:
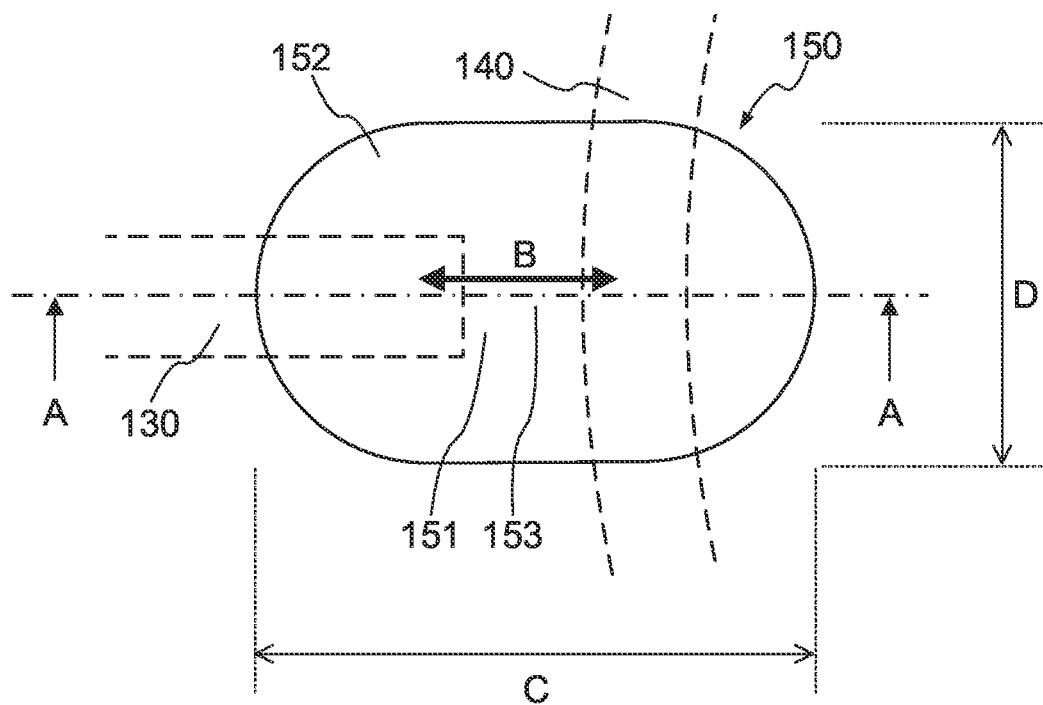
FIG. 3 is an enlarged bottom view of a valve.

Fluid handling device 100 may include one first channel 130 and one second channel 140, or may include two or more of each channels. The numbers of first channels 130 and second channels 140 are not limited, and are appropriately selected according to the application of fluid handling device 100. In the present embodiment, fluid handling device 100 includes plurality of first channels 130 and one second channel 140 that branches into channels, as illustrated in FIG. 3. Partition wall 151 of valve 150 is disposed between second channel 140 and each of first channels 130.

Plurality of first channels 130 are connected to second channels 140 at different positions of second channels 140 via valves 150 (described below), respectively. One end of each first channel 130 is connected to well 160 and the other end of each first channel 130 is connected to valve 150.

In the present embodiment, second channel 140 includes two branch channels 140a and 140b and one common channel 140c as illustrated in FIG. 2. One end of each of two branch channels 140a and 140b is connected to one end of common channel 140c. Two branch channels 140a and 140b extend in the circumferential direction. The other end of common channel 140c is connected to rotary membrane pump 170.

Valve 150 is a membrane valve (diaphragm valve) disposed at a connection part between first channel 130 and second channel 140, and is configured to control the flow of a fluid between first channel 130 and second channel 140. Fluid handling device 100 may include only one valve 150 or two or more valves 150. In the present embodiment, fluid handling device 100 includes plurality of valves 150 according to the number of first channels 130. In the present embodiment, plurality of valves 150 are disposed along one circle. In this configuration, plurality of valves 150 function as a rotary membrane valve whose opening and closing is controlled by the rotation of first rotary member 210 (described below).

Each valve 150 includes partition wall 151 disposed between first channel 130 and second channel 140, and diaphragm 152 disposed so as to face partition wall 151, a portion of first channel 130, and a portion of second channel 140.

Partition wall 151 is a portion of substrate 110 and functions as a valve seat of a membrane valve for opening and closing the passage between first channel 130 and second channel 140. Partition wall 151 may have any shape and height that allow the partition wall to exhibit the above functions. Partition wall 151 has, for example, a shape of a quadrangular prism. The height of partition wall 151 is, for example, the same as the depth of either channel.

Figure 4A:
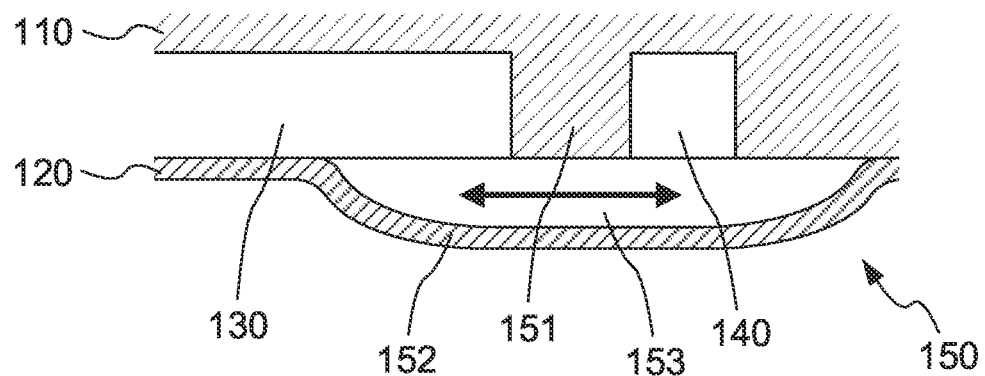
FIGS. 4A and 4B are cross-sectional views taken along line A-A of FIG. 3.
Figure 4B:
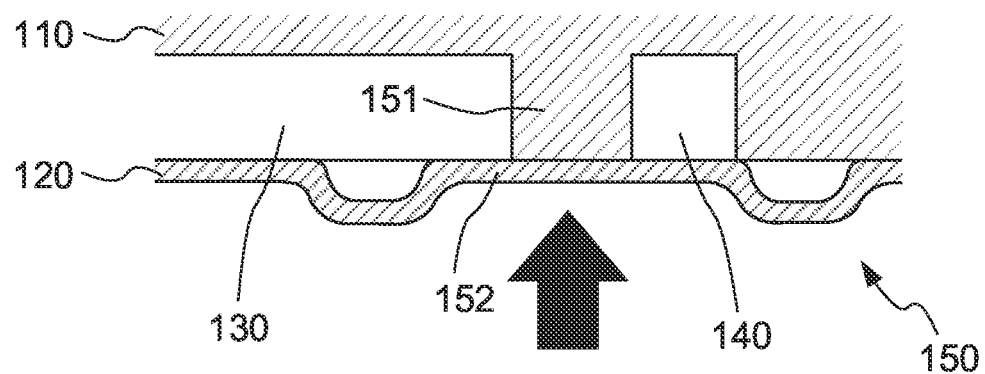

FIG. 3 is an enlarged bottom view of valve 150, and FIGS. 4A and 4B are cross-sectional views taken along line A-A of FIG. 3. FIG. 4A illustrates a cross section of valve 150 when no pressure is applied to diaphragm 152, and FIG. 4B illustrates the cross section of valve 150 when pressure is applied to diaphragm 152.

Diaphragm 152 is a portion of film 120 that is flexible. Diaphragm 152 is configured in such a way that a gap is formed between diaphragm 152 and partition wall 151 (FIG. 4A)—the gap serving as third channel 153 allowing first channel 130 and second channel 140 to communicate with each other—when no pressure is applied to diaphragm 152. In addition, diaphragm 152 is configured in such a way that diaphragm 152 and partition wall 151 come into contact with each other so that first channel 130 and second channel 140 are cut off from each other, i.e., there is no passage between first channel 130 and second channel 140 (FIG. 4B) when pressure is applied to diaphragm 152 (indicated by the upward arrow in FIG. 4B).

When viewed in plan view (as viewed from the bottom side, namely bottom view), the length of diaphragm 152 (indicated by arrow C in FIG. 3) in the extending direction of third channel 153 (a radial direction of the circle indicated by arrow B in FIG. 3) is longer than the length of diaphragm 152 (indicated by arrow D in FIG. 3) in the direction orthogonal to the extending direction. Such a shape reduces the width of third channel 153, thereby reducing the dead volume in the space between substrate 110 and diaphragm 152. The "width of a channel" as used herein means the length of the channel in the direction orthogonal to the flow direction of the fluid when viewed in plan view (bottom view). The "length of a diaphragm in the extending direction of a third channel" as used herein means the maximum length of diaphragm 152 in the extending direction of third channel 153. The "length of a diaphragm in the direction orthogonal to the extending direction" as used herein means the maximum length of diaphragm 152 in the direction orthogonal to the extending direction.

In the present embodiment, diaphragm 152 in plan view (bottom view) has a shape of an oval (rounded rectangle) as illustrated in FIG. 3. In other words, diaphragm 152 in plan view (bottom view) has a shape surrounded by two sides facing each other and parallel to the extending direction of third channel 153 and two arcs facing each other, and each arc is connected to one end of one of the sides and the other end of the other of the sides (a shape obtained by combining one rectangle and two semicircles).

In the present embodiment, the width of third channel 153 (the space between substrate 110 and diaphragm 152) is preferably a value close to the width of first channel 130. Specifically, the width of third channel 153 is preferably 50% or more and 500% or less, and more preferably 80% or more and 200% or less with respect to the width of first channel 130. A width in the above range can reduce the dead volume.

The cross-sectional area of third channel 153 may be or may not be constant in the flow direction of the fluid. In the present embodiment, the cross-sectional area of third channel 153 is constant in the range above partition wall 151. Third channel 153 may have any height (distance between partition wall 151 and diaphragm 152) that appropriately allows a fluid to flow in the channel. The height of third channel 153 is preferably in the range of 5 to 200 µm, more preferably in the range of 10 to 100 µm, from the viewpoint of reducing the pressure loss of the fluid.

Well 160 is a bottomed recess with an opening at the top thereof, and functions as an introduction part for introducing a fluid into a channel of fluid handling device 100, an take-out part for taking out a fluid from a channel of fluid handling device 100, or an air hole for moving a fluid into a channel of fluid handling device 100. When a liquid is used as the fluid, well 160 can house the liquid. For majority of the plurality of wells 160, one end of first channel 130 is opened at the bottom of each well. In the present embodiment, for one of the plurality of wells 160, one end of fourth channel 172 connected to rotary membrane pump 170 is opened into the well. Well 160 may have any shape and size that allow the well to exhibit the above functions. The shape of well 160 is, for example, a substantially truncated cone shape or a substantially cylindrical shape. In the present embodiment, well 160 has a shape of a truncated cone. In addition, on the front side of fluid handling device 100, a wall surrounding well 160 projects from the surface of substrate 110 (see FIG. 5). The number of wells 160 is not limited, and is appropriately selected according to the application of fluid handling device 100.

Rotary membrane pump 170 is a space formed between substrate 110 and film 120, and the space substantially has a shape of an arc ("C" shape) in plan view. One end of rotary membrane pump 170 is connected to second channel 140, and the other end of rotary membrane pump 170 is connected to well 160 via fourth channel 172. In the present embodiment, rotary membrane pump 170 is composed of the bottom surface of substrate 110 and diaphragm 171 that faces the bottom surface in such a way that the diaphragm is spaced apart from the bottom surface. Diaphragm 171 is a portion of film 120 that is flexible (see FIG. 5). Diaphragm 171 is disposed on the circumference of one circle whose center is second central axis CA2. The cross-sectional shape—orthogonal to the circumference—of diaphragm 171 may be any shape, which substantially is a shape of an arc in the present embodiment.

Diaphragm 171 of rotary membrane pump 170 bends to come into contact with substrate 110 when pressure is applied. For example, when second protrusion 222 (described below) of second rotary member 220 presses diaphragm 171 while second protrusion 222 slides along the diaphragm from the connection part between diaphragm 171 and second channel 140 to the connection part between diaphragm 171 and fourth channel 172 (i.e., counterclockwise in FIG. 2), a fluid in second channel 140 moves toward rotary membrane pump 170 to create a negative pressure in second channel 140. At the same time, a fluid in rotary membrane pump 170 moves toward fourth channel 172 to create a positive pressure in fourth channel 172. On the other hand, when second protrusion 222 presses diaphragm 171 while second protrusion 222 slides along the diaphragm from the connection part between diaphragm 171 and fourth channel 172 to the connection part between diaphragm 171 and second channel 140 (i.e., clockwise in FIG. 2), a fluid in fourth channel 172 moves toward rotary membrane pump 170 to create a negative pressure in fourth channel 172. At the same time, a fluid in rotary membrane pump 170 moves toward second channel 140 to create a positive pressure in second channel 140.

Fluid handling device 100 of the present invention is not limited to the present embodiment. In the fluid handling device of the present invention, plurality of valves 150 are disposed at the connection parts between one or more first channels 130 and one or more second channels 140, respectively. Plurality of valves 150 may be disposed on one straight line. Alternatively, the fluid handling device of the present invention may include one first channel 130 and one second channel 140, and may include only one valve 150 disposed at the connection part between the channels, as described above.

Configuration of Fluid Handling System

In the following, a fluid handling system capable of controlling the operations of a rotary membrane valve (valve 150) and a rotary membrane pump of fluid handling device 100 will be described.

FIG. 5 is a cross-sectional view illustrating the configuration of fluid handling system 200 according to the present embodiment.

As illustrated in FIG. 5, fluid handling system 200 includes first rotary member 210, second rotary member 220, and fluid handling device (channel chip) 100. First rotary member 210 is independently rotated about first central axis CA1 by an external drive mechanism (not illustrated). Second rotary member 220 is independently rotated about second central axis CA2 by an external drive mechanism (not illustrated). Fluid handling device 100 includes substrate 110 and film 120, and film 120 is placed so as to come into contact with first rotary member 210 and second rotary member 220. FIG. 5 illustrates the components separately for easy understanding of the configuration of fluid handling system 200.

Figure 6A:
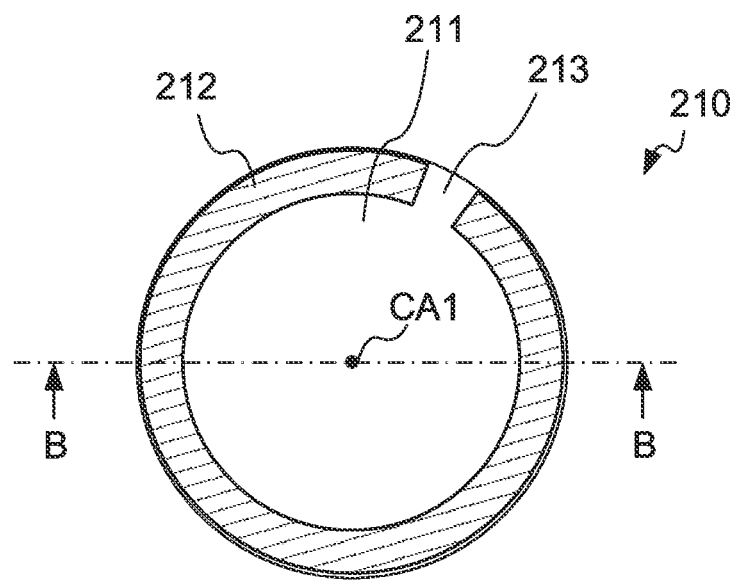
FIG. 6A is a plan view of a first rotary member.
Figure 6B:
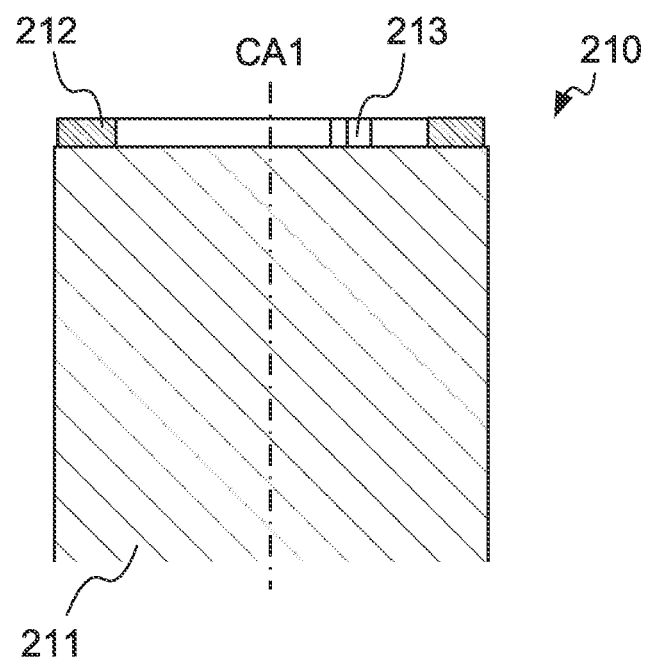
FIG. 6B is a cross-sectional view taken along line B-B of FIG. 6A.

FIG. 6A is a plan view of first rotary member 210, and FIG. 6B is a cross-sectional view taken along line B-B of FIG. 6A. In FIG. 6A, hatching is provided on the top surface of first protrusion 212 for distinct showing of the surface.

First rotary member 210 includes first main body 211 having a cylindrical shape and first protrusion 212 disposed on the top surface of first main body 211. First main body 211 is rotatable about first central axis CA1. First main body 211 is rotated by an external drive mechanism (not illustrated).

First main body 211 includes, in the upper portion thereof, first protrusion 212 for closing valve 150 by pressing diaphragm 152, and first recess 213 for opening valve 150 by not pressing diaphragm 152. First protrusion 212 and first recess 213 are disposed on the circumference of a circle whose center is first central axis CA1. In the present embodiment, first protrusion 212 in plan view has a shape of an arc ("C" shape) corresponding to a portion of the circle whose center is first central axis CA1. The region, on the circumference, where first protrusion 212 is not present is first recess 213.

First protrusion 212 projects relatively with respect to first recess 213, and first recess 213 is recessed relatively with respect to first protrusion 212. In other words, first protrusion 212 functions as a pressing part, and first recess 213 functions as non-pressing part. In the example illustrated in FIG. 6B, for example, first protrusion 212 protrudes from the top surface (reference surface) of first main body 211, and the bottom surface of first recess 213 is at the same height as the top surface (reference surface) of first main body 211. Alternatively, the top surface of first protrusion 212 may be at the same height as the top surface (reference surface) of first main body 211, and in this case, first recess 213 is recessed into the top surface (reference surface) of first main body 211.

Figure 7A:
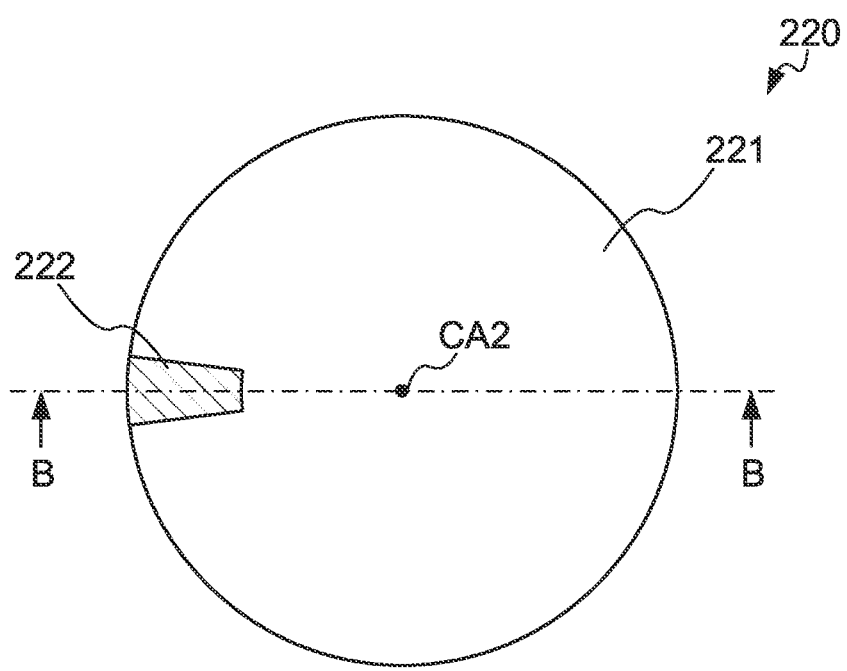
FIG. 7A is a plan view of a second rotary member.
Figure 7B:
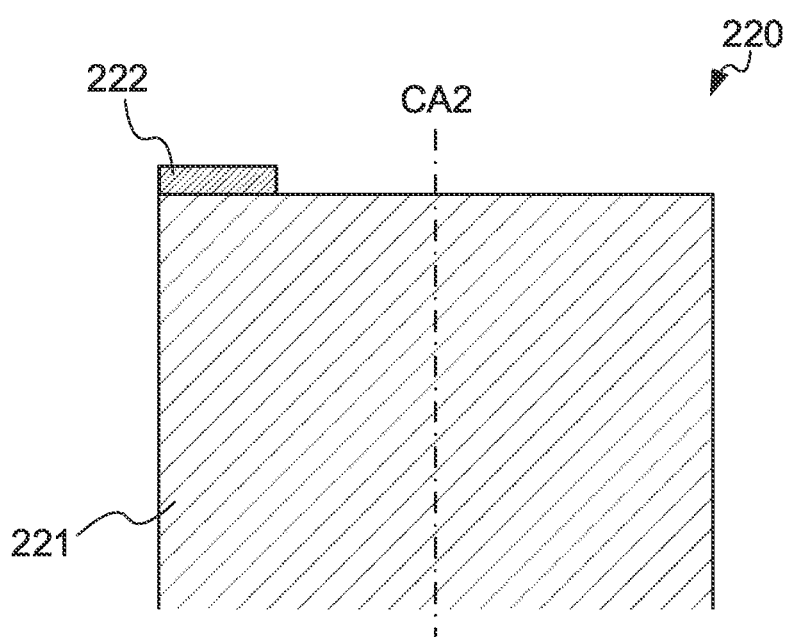
FIG. 7B is a cross-sectional view taken along line B-B of FIG. 7A.

FIG. 7A is a plan view of second rotary member 220, and FIG. 7B is a cross-sectional view taken along line B-B of FIG. 7A. In FIG. 7A, hatching is provided on the top surface of second protrusion 222 for distinct showing of the surface.

Second rotary member 220 includes second main body 221 having a cylindrical shape and second protrusion 222 disposed on the top surface of second main body 221. Second main body 221 is rotatable about second central axis CA2. Second main body 221 is rotated by an external drive mechanism (not illustrated).

Second main body 221 includes, in the upper portion thereof, second protrusion 222 for operating rotary membrane pump 170 by pressing diaphragm 171 while sliding along the diaphragm. Second protrusion 222 is disposed on the circumference of a circle whose center is second central axis CA2. Second protrusion 222 may have any shape that allows for appropriate operation of rotary membrane pump 170. In the present embodiment, second protrusion 222 in plan view has a shape of an arc corresponding to a portion of the circle whose center is second central axis CA2.

In fluid handling system 200 according to the present embodiment, first protrusion 212 of first rotary member 210 controls the opening and closing of plurality of valves 150 of fluid handling device 100, as described above. For achieving the above control, plurality of valves 150 of fluid handling device 100 and first protrusion 212 of first rotary member 210 are disposed so as to be positioned on the circumference of the first circle whose center is first central axis CA1.

In fluid handling system 200 according to the present embodiment, second protrusion 222 of second rotary member 220 similarly controls the operation of rotary membrane pump 170 of fluid handling device 100. For achieving the above control, rotary membrane pump 170 of fluid handling device 100 and second protrusion 222 of second rotary member 220 are disposed so as to be positioned on the circumference of the second circle whose center is second central axis CA2.

Operation of Fluid Handling System and Fluid Handling Device

In the following, the operation of fluid handling device 100 and fluid handling system 200 will be described with reference to FIGS. 8 and 9. Regarding plurality of valves 150 in FIGS. 8 and 9, when a valve is pressed and closed by first protrusion 212 of first rotary member 210, diaphragm 152 of the valve is indicated by a black circle, and when a valve is not closed because first recess 213 is facing the valve, diaphragm 152 of the valve is indicated by an unfilled circle, for convenience of explanation.

Among the plurality of wells 160, for example, a sample is introduced into one well 160 connected to second channel (branch channel) 140a, and a dissolution liquid is introduced into one well 160 connected to second channel (branch channel) 140b. For convenience of explanation, the well with the sample introduced thereto is referred to as sample well 160a, the well with the dissolution liquid introduced thereto as dissolution liquid well 160b, first channel 130 connected to sample well 160a as first channel 130a, and first channel 130 connected to dissolution liquid well 160b as first channel 130b. In addition, valve 150 disposed between first channel 130a and second channel 140 is referred to as valve 150a, and valve 150 disposed between first channel 130b and second channel 140 as valve 150b. At this time, all valves 150 are closed.

Figure 8:
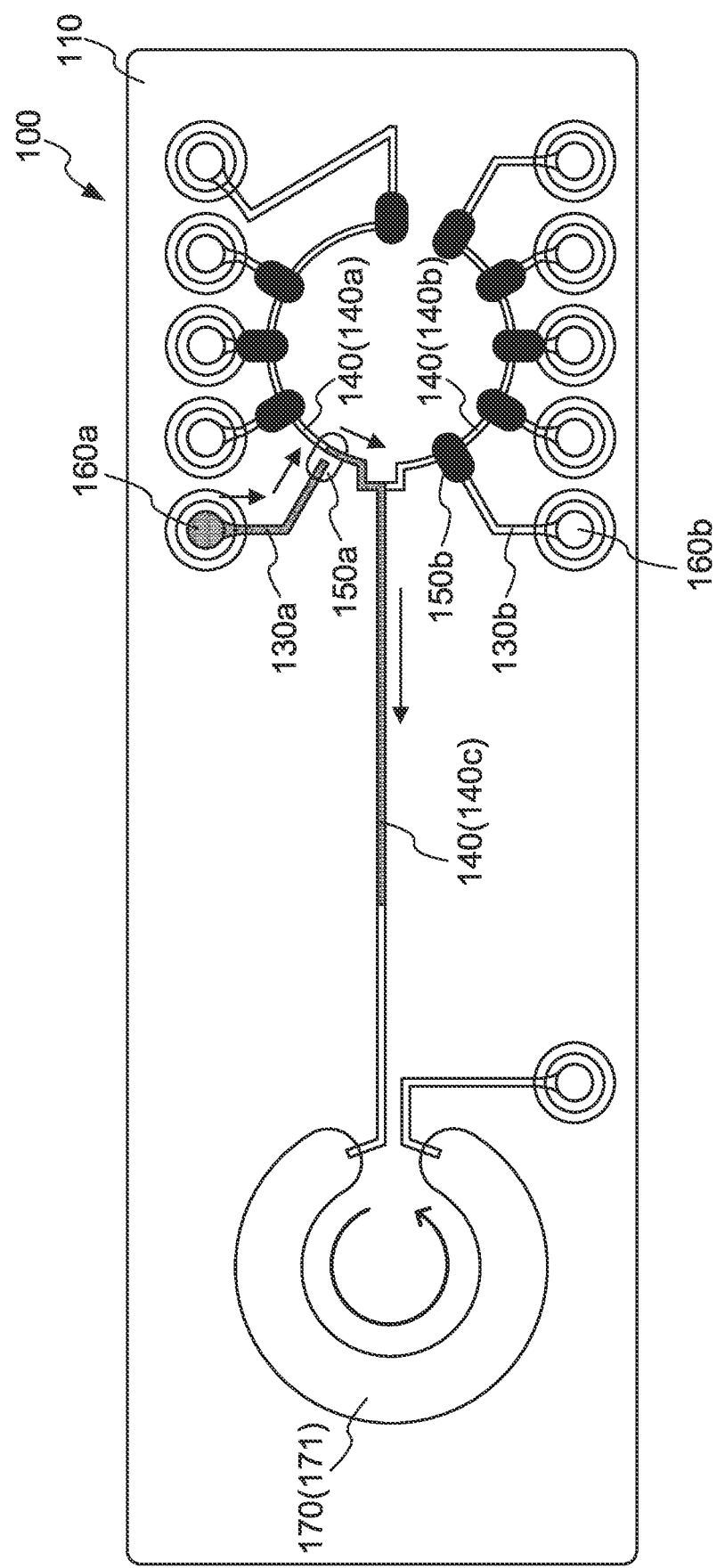
FIG. 8 is a schematic view for describing the operations of the fluid handling system and the fluid handling device according to an embodiment.
Figure 9:
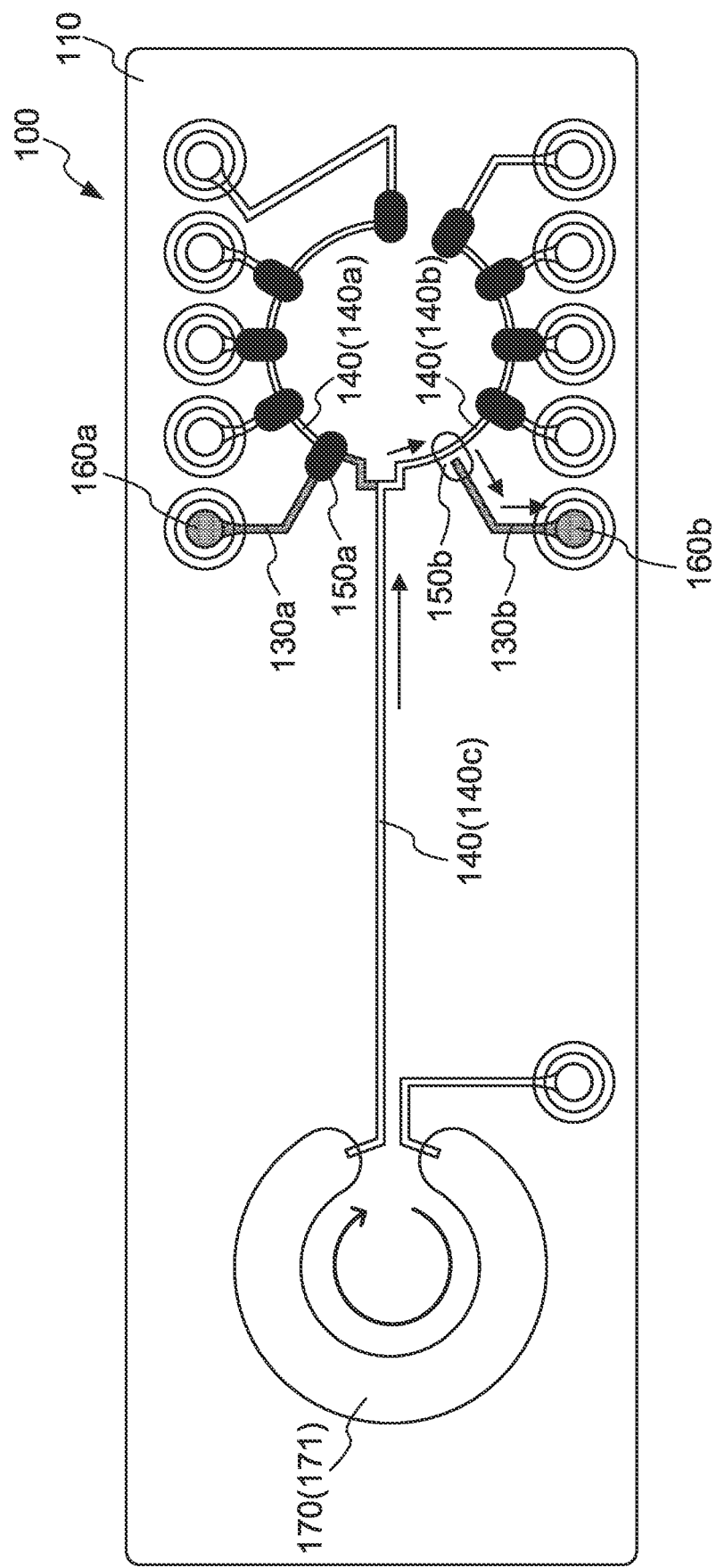
FIG. 9 is a schematic view for describing the operations of the fluid handling system and the fluid handling device according to the embodiment.

As illustrated in FIG. 8, first rotary member 210 is then rotated to open only valve 150a, and second rotary member 220 is rotated counterclockwise to move the sample in sample well 160a into second channel (common channel) 140c via first channel 130a and valve 150a. As illustrated in FIG. 9, first rotary member 210 is then rotated to close valve 150a and open only valve 150b, and second rotary member 220 is rotated clockwise to move the sample in second channel (common channel) 140c to dissolution liquid well 160b via valve 150b and first channel 130b. This operation mixes the sample and the dissolution liquid in dissolution liquid well 160b.

Effects

As described above, in fluid handling device 100 and fluid handling system 200 according to the present embodiment, control of the opening and closing of each valve 150 can be easily performed, and also dead volume in each valve is small. Therefore, fluid handling device 100 and fluid handling system 200 according to the present embodiment are capable of, for example, analyzing even a small amount of sample with high accuracy. In addition, in fluid handling device 100 and fluid handling system 200 according to the present embodiment, the width of each valve 150 (the length of diaphragm 152 in the direction orthogonal to the extending direction of third channel 153) is small, and thus it is possible to dispose plurality of valves 150 at a higher density than a conventional device. Therefore, fluid handling device 100 and fluid handling system 200 according to the present embodiment can be made compact.

Modification

The fluid handling device according to the present invention is not limited to the above described example. For example, diaphragm 152 of valve 150 may have any other shape so long as the length of the diaphragm in the extending direction of third channel 153 is longer than the length of the diaphragm in the direction orthogonal to the extending direction of third channel 153.

Figure 10:
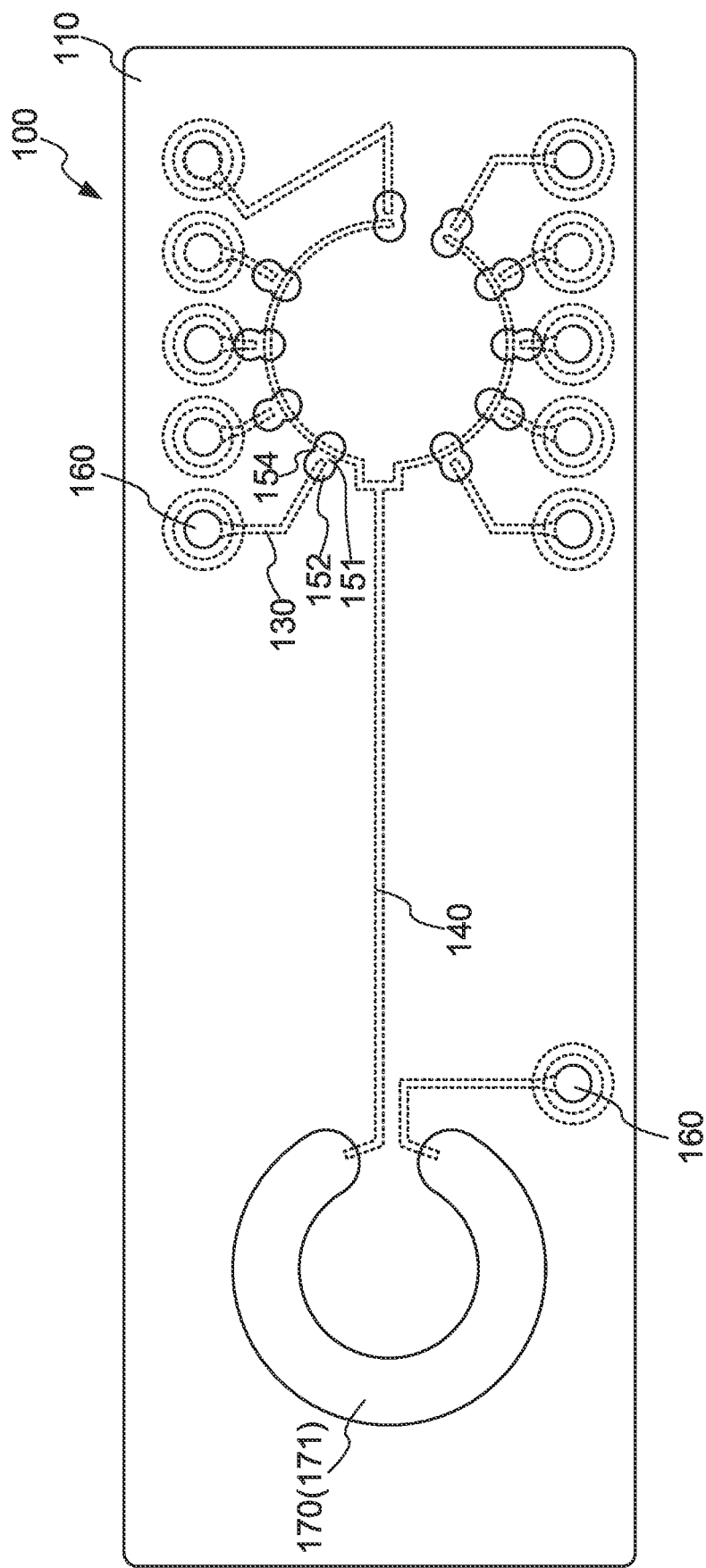
FIG. 10 is a bottom view of a fluid handling device according to a modification.
Figure 11:
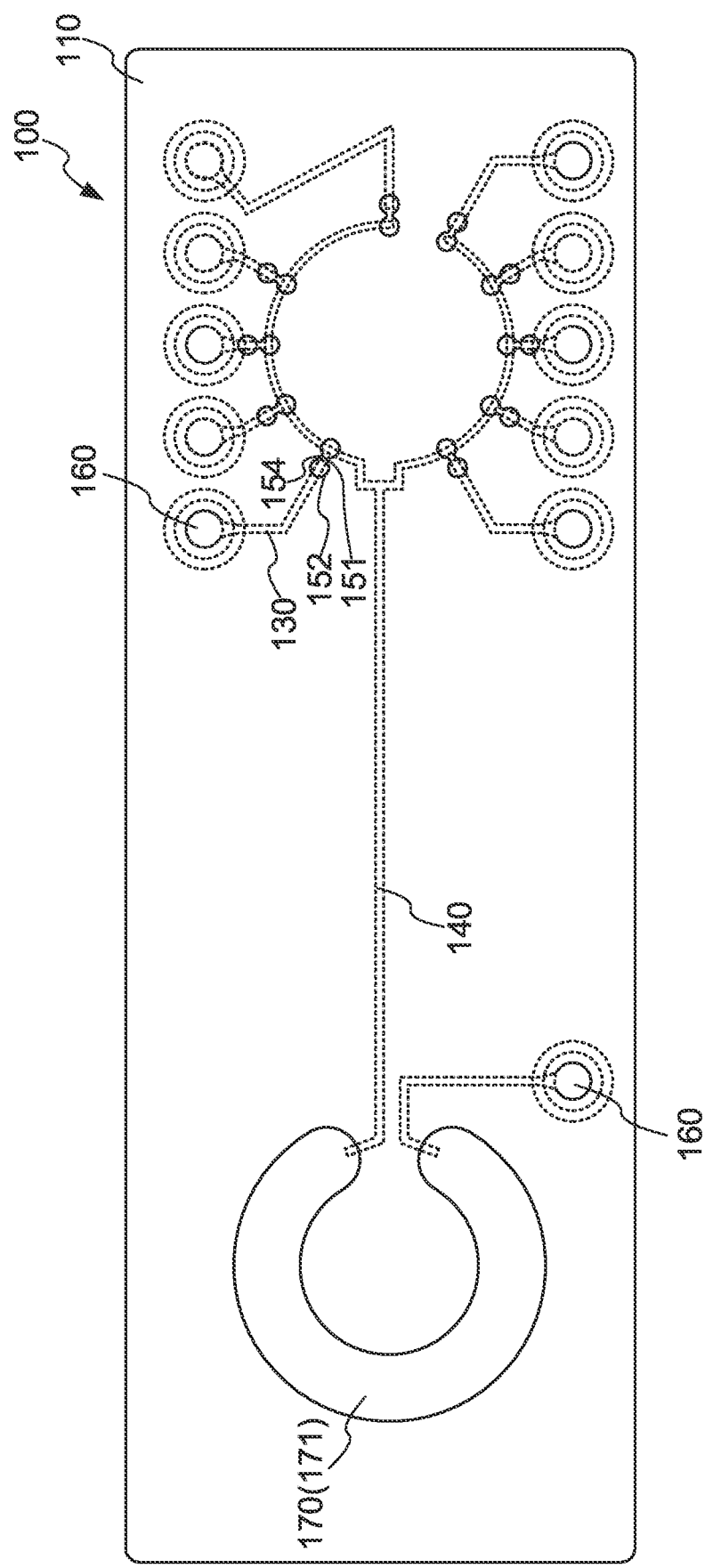
FIG. 11 is a bottom view of a fluid handling device according to a modification.

In fluid handling device 100 according to the present embodiment, for example, diaphragm 152 may include narrow part 154 disposed so as to face partition wall 151 as illustrated in FIGS. 10 and 11. In the example illustrated in FIG. 10, diaphragm 152 in plan view has a shape in which two circles are partially overlapped. In the example illustrated in FIG. 11, diaphragm 152 in plan view has a shape in which two circles are connected to each other via a rectangle. Providing narrow part 154 can further reduce the dead volume in third channel 153. As first protrusion 212 of first rotary member 210 presses narrow portion 154, the pressing force for closing valve 150 can also be reduced. From the viewpoint of reducing the pressure loss of the fluid, in narrow part 154, it is preferable that the cross-sectional area of third channel 153 is equal to or larger than the cross-sectional area of first channel 130 and equal to or larger than the cross-sectional area of second channel 140.

Figure 12:
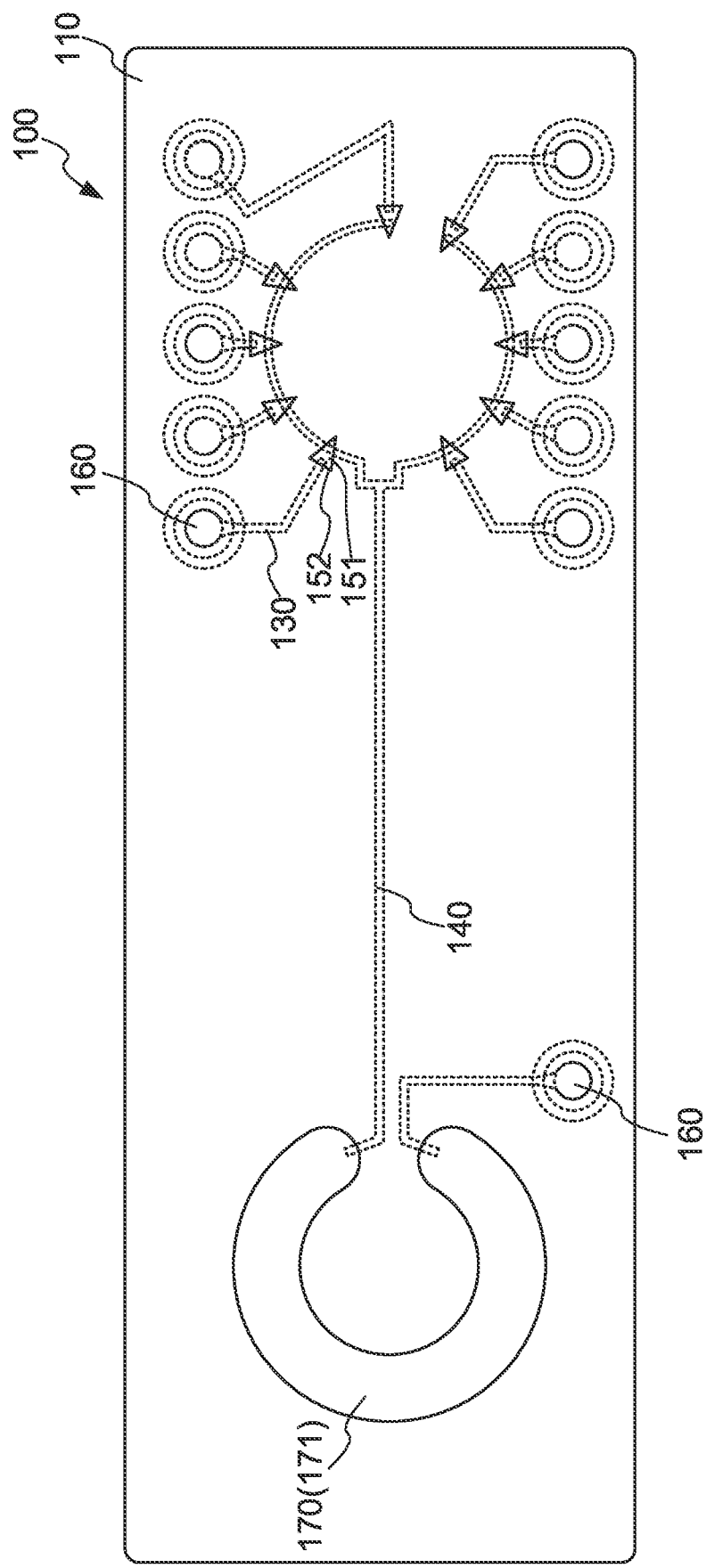
FIG. 12 is a bottom view of a fluid handling device according to a modification.

In addition, in fluid handling device 100 according to the present embodiment, diaphragm 152 in plan view may have a substantially triangular shape as illustrated in FIG. 12. The triangle may have any shape that allows the length of the triangle in the extending direction of third channel 153 to be longer than the length of the triangle in the direction orthogonal to the extending direction. In the present embodiment, the triangle is an isosceles triangle with the apex angle thereof on the first central axis CA1 side. This configuration can reduce the dead volume. From the viewpoint of reducing the pressure loss of the fluid, diaphragm 152 is preferably disposed in such a way that the minimum cross-sectional area of third channel 153 is equal to or larger than the cross-sectional area of first channel 130 and equal to or larger than the cross-sectional area of second channel 140 in this configuration.

2. Production Jig

In the following, production jig 300 and production jig 400 that can be used for producing fluid handling device 100 according to the present embodiment will be described.

Figure 13:
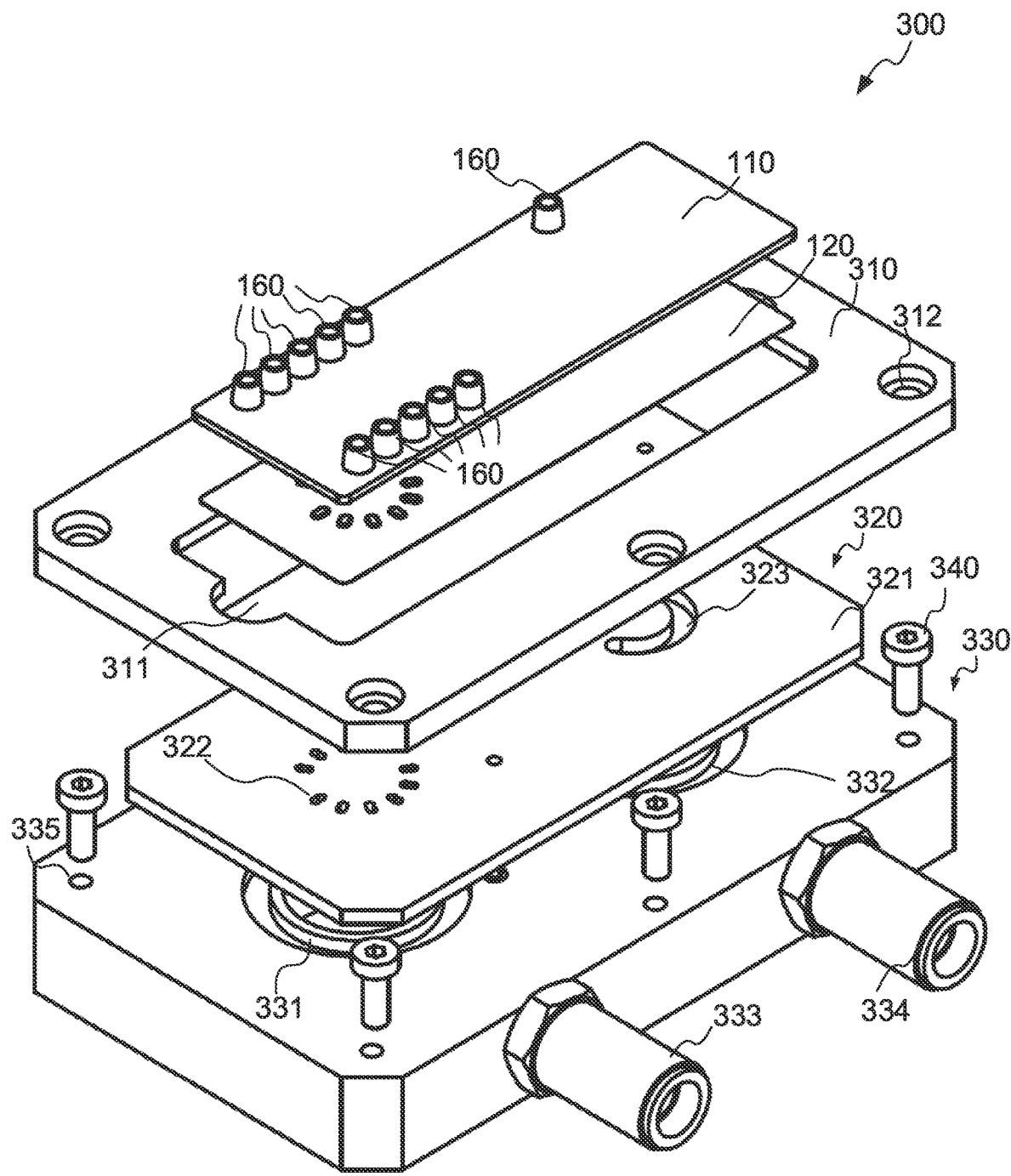
FIG. 13 is an exploded perspective view of a production jig.

FIG. 13 is an exploded perspective view of production jig 300. As illustrated in FIG. 13, production jig 300 includes pressing member 310, plate-shaped mold 320, suction member 330, and at least one screw 340.

Pressing member 310 includes substrate disposition part 311 and at least one screw hole 312. Threadedly engaging screw 340 with threaded bore 335 of suction member 330 via screw hole 312 allows pressing member 310 to fix plate-shaped mold 320 to suction member 330 while the mold is positioned with respect to suction member 330.

Substrate disposition part 311 is a through hole for forming, together with plate-shaped mold 320, a bottomed recess for disposing substrate 110 and film 120. Substrate disposition part 311 may have any shape and size that allow for appropriate positioning of substrate 110 and film 120.

Screw hole 312 is a through hole that allows screw 340 to pass therethrough. Screw hole 312 may have any shape and size which are determined according to the size of the shaft of screw 340. No screw thread may be formed on the inner surface of screw hole 312.

Plate-shaped mold 320 includes sheet metal 321 and plurality of first through holes 322 for forming plurality of diaphragms 152, and second though hole 323 for forming diaphragm 171. Plate-shaped mold 320 is a mold for forming diaphragms 152 and diaphragm 171 each having a desired shape.

Plurality of first through holes 322 and second through hole 323 are formed, for example, by laser machining sheet metal 321. The shape of first through holes 322 in plan view is the same as the shape of diaphragms 152 to be formed in plan view. The shape of second through hole 323 in plan view is the same as the shape of diaphragm 171 to be formed in plan view.

Suction member 330 includes first suction part 331, second suction part 332, first suction port 333, second suction port 334, and at least one threaded bore 335. Suction member 330 creates negative pressures in first suction part 331 and second suction part 332 by air suction pumps (not illustrated) connected to first suction port 333 and second suction port 334, respectively. Plurality of first through holes 322 of plate-shaped mold 320 are disposed on first suction part 331, and second through hole 323 of plate-shaped mold 320 is disposed on second suction part 332. Packing (not illustrated) for improving the airtightness of first suction part 331 and second suction part 332 is preferably disposed at the peripheries of first suction part 331 and second suction part 332.

The bottoms of first suction part 331 and second suction part 332 communicate with first suction port 333 and second suction port 334, respectively. This configuration creates a negative pressure in first suction part 331 and second suction part 332 when air is sucked from first suction port 333 and second suction port 334. At this time, film 120 is deformed toward suction member 330 through first through holes 322 or second through hole 323 of plate-shaped mold 320, thereby forming diaphragms 152 of valves 150 or diaphragm 171 of rotary membrane pump 170. First suction part 331 and second suction part 332 may have any shapes that allow the parts to exhibit the above functions.

First suction port 333 and second suction port 334 are each connected to an external air suction pump or the like. First suction port 333 and second suction port 334 may have any shape and size that allow the ports to exhibit the above functions.

Threaded bore 335 is for threadedly engaging screw 340. Screw thread is formed on the inner surface of threaded bore 335. The shape and size of threaded bore 335 are determined according to the size of the shaft of screw 340.

Screw 340 is a component for fixing pressing member 310 to suction member 330. Plate-shaped mold 320 is fixed while being placed between pressing member 310 and suction member 330. Not only screw 340 is used for fixing pressing member 310 to suction member 330. For example, a clamp may be used for fixing pressing member 310 to suction member 330.

For producing fluid handling device 100 by using production jig 300, substrate 110 and film 120 may be heated from the outside to adhere each other, or substrate 110 and film 120 may be adhered in advance and then disposed in production jig 300. By sucking air from first suction port 333 and second suction port 334 while the temperature of film 120 is high, diaphragms 152 of valves 150 and diaphragm 171 of rotary membrane pump 170 can be formed at respective predetermined positions in film 120.

As illustrated in FIG. 13, production jig 300 can be disassembled, and thus plate-shaped mold 320 can be removed and replaced. Replacing plate-shaped mold 320 with another plate-shaped mold 320 having different shapes of first through hole(s) 322 and second through hole 323 can change the shapes of diaphragms 152 of valves 150 and diaphragm 171 of rotary membrane pump 170. This configuration can reduce the manufacturing cost as compared with producing of an integrated production jig for every different shape of diaphragm 152 or diaphragm 171.

Figure 14:
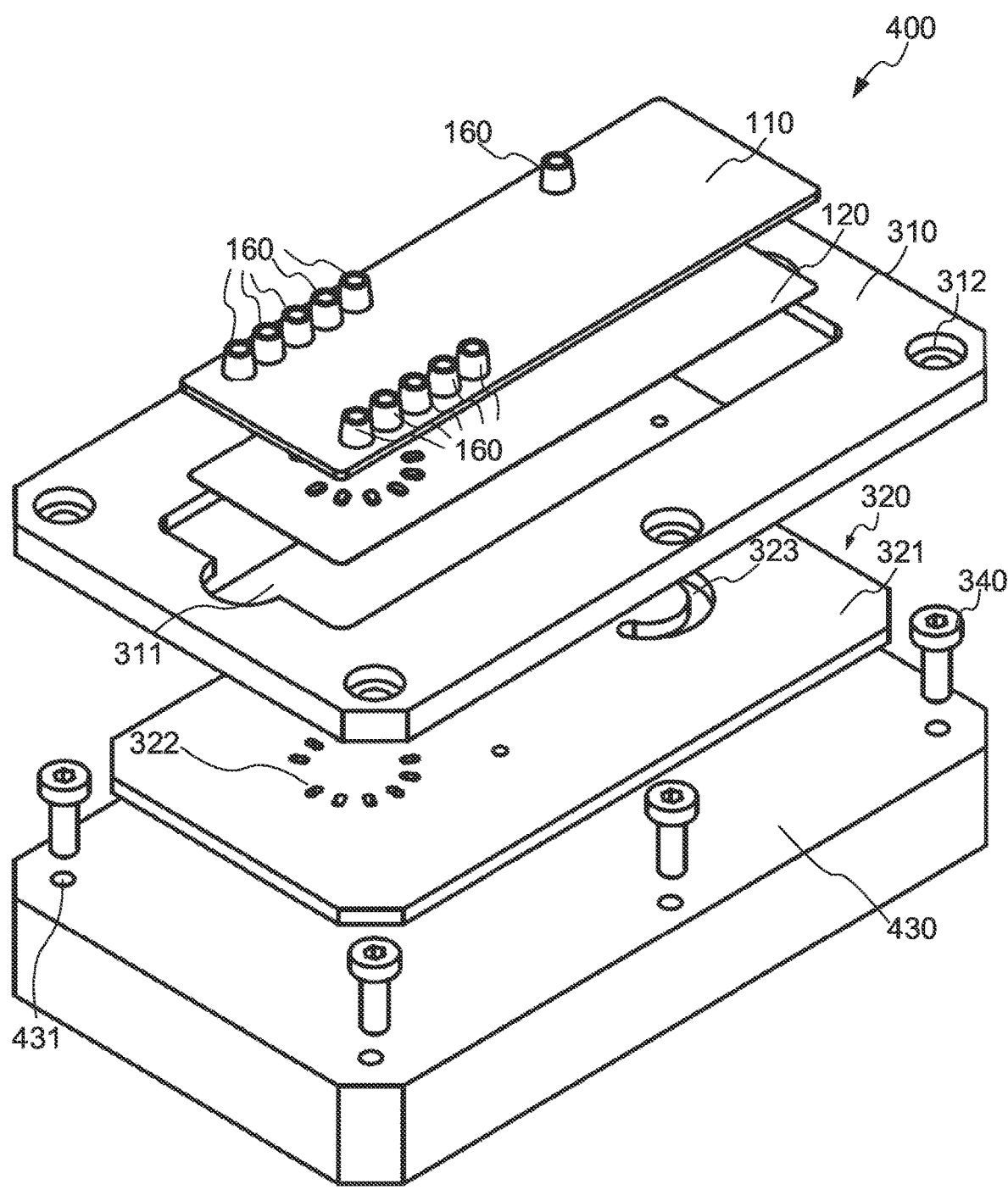
FIG. 14 is an exploded perspective view of another production jig.

FIG. 14 is an exploded perspective view of production jig 400. As illustrated in FIG. 14, production jig 400 differs from production jig 300 in that production jig 400 includes support member 430 in place of suction member 330. In the following, detailed description of the common configuration will be omitted.

Plate-shaped mold 320 and pressing member 310 are superposed on support member 430. In other words, support member 430 supports plate-shaped mold 320 and pressing member 310 from below. Substrate 110 with film 120 joined thereto is placed in substrate disposition part 311 of pressing member 310.

Support member 430 includes at least one threaded bore 431. Threaded bore 431 is for threadedly engaging screw 340. Screw thread is formed on the inner surface of threaded bore 431. The shape and size of threaded bore 431 are determined according to the size of the shaft of screw 340.

For producing fluid handling device 100 by using production jig 400, an external air introduction pump (not illustrated) or the like is connected to at least one of plurality of wells 160 of substrate 110, and air is sent from the air introduction pump into the connected well 160 while the other wells 160 are closed. In this configuration, film 120 is deformed by the introduced air toward support member 430 through first through holes 322 or second through hole 323 of plate-shaped mold 320, thereby forming diaphragms 152 of valves 150 or diaphragm 171 of rotary membrane pump 170.

INDUSTRIAL APPLICABILITY

Fluid handling devices and fluid handling systems of the present invention are particularly advantageous, for example, in a variety of applications such as clinical, food, and environmental testing.

REFERENCE SIGNS LIST

100 Fluid handling device
110 Substrate
120 Film
130 First channel
140 Second channel
140a, b Branch channel
140c Common channel
150 Valve
151 Partition wall
152 Diaphragm
153 Third channel
154 Narrow part
160 Well
170 Rotary membrane pump
171 Diaphragm
172 Fourth channel
200 Fluid handling system
210 First rotary member
211 First main body
212 First protrusion
213 First recess
220 Second rotary member
221 Second main body
222 Second protrusion
300, 400 Production jig
310 Pressing member
311 Substrate disposition part
312 Screw hole
320 Plate-shaped mold
321 Sheet metal
322 First through hole
323 Second through hole
330 Suction member
331 First suction part
332 Second suction part
333 First suction port
334 Second suction port
335, 431 Threaded bore
340 Screw
430 Support member
CA1 First central axis
CA2 Second central axis

The invention claimed is:
1. A fluid handling device, comprising:
a first channel;
a second channel; and
a valve disposed at a connection part between the first channel and the second channel,
wherein
the valve include
a partition wall disposed between the first channel and the second channel, and
a diaphragm disposed so as to face the partition wall, a portion of the first channel, and a portion of the second channel, wherein
the diaphragm is configured in such a way that
when no pressure is applied to the diaphragm, a gap is formed between the diaphragm and the partition wall, the gap serving as a third channel that allows the first channel and the second channel to communicate with each other, and
when pressure is applied to the diaphragm, the diaphragm and the partition wall come into contact with each other so that the first channel and the second channel are cut off from each other, and
when the diaphragm is viewed in plan view, a length of the diaphragm in an extending direction of the third channel is longer than a length of the diaphragm in a direction orthogonal to the extending direction.

2. The fluid handling device according to claim 1, wherein the diaphragm includes a narrow part disposed so as to face the partition wall.

3. The fluid handling device according to claim 1, comprising:
- the first channel or a plurality of the first channels,
- the second channel or a plurality of the second channels, and
- a plurality of the valves disposed along one circle, wherein
- in each of the plurality of valves, the extending direction of the third channel is along a radial direction of the circle.

4. The fluid handling device according to claim 3, further comprising a rotary membrane pump connected to the second channel.

5. A fluid handling system, comprising:
- the fluid handling device according to claim 3; and
- a rotary member configured to rotate about a central axis passing through a center of the circle, the rotary member including a protrusion for pressing a plurality of the diaphragms.

* * * * *